US005721847A

United States Patent [19]
Johnson

[11] Patent Number: 5,721,847
[45] Date of Patent: Feb. 24, 1998

[54] METHOD AND SYSTEM FOR LINKING CONTROLS WITH CELLS OF A SPREADSHEET

[75] Inventor: Jeffrey J. Johnson, Bellevue, Wash.

[73] Assignee: Microsoft Corporation, Redmond, Wash.

[21] Appl. No.: 789,076

[22] Filed: Feb. 3, 1997

Related U.S. Application Data

[63] Continuation of Ser. No. 327,196, Oct. 21, 1994, abandoned.

[51] Int. Cl.[6] ........................................ G06F 3/14
[52] U.S. Cl. ........................................ 395/333; 395/326
[58] Field of Search ........................ 395/326, 327, 395/328, 329, 330, 331, 332, 333, 334, 335, 339

[56] References Cited

U.S. PATENT DOCUMENTS

| | | | |
|---|---|---|---|
| 5,226,118 | 7/1993 | Baker et al. | 395/161 |
| 5,367,633 | 11/1994 | Matheny et al. | 395/164 |
| 5,432,903 | 7/1995 | Frid-Nielsen | 395/161 |
| 5,432,940 | 7/1995 | Potts et al. | 395/700 |
| 5,434,965 | 7/1995 | Matheny et al. | 395/159 |
| 5,446,842 | 8/1995 | Schaeffer et al. | 395/200.01 |

OTHER PUBLICATIONS

Portion of HELP File from QUATRO PRO Version 5.0 (16 pages).
Using QUATTRO PRO 6 for Windows Sep. 16, 1994 pp. 284–289, 355–356, 508–543, 648–658, 660–663.

*Primary Examiner*—Thomas G. Black
*Assistant Examiner*—Ruay Lian Ho
*Attorney, Agent, or Firm*—Ronald M. Anderson

[57] ABSTRACT

A method and apparatus for inserting a selected graphic control within a spreadsheet, chart, or dialog sheet. The graphic control can be selected from a Forms button toolbar and then positioned within a desired workspace of a spreadsheet program. The graphic controls provided on the Forms button toolbar include a check box, an option box, a list box, a drop-down box, a combination list-edit box, a combination drop-down list-edit box, a scrollbar, and a spinner. A Format Object properties dialog box is also provided on the Forms button toolbar to enable the user to set various parameters for the graphic control. These parameters include an identification of the cell within the spreadsheet to which the graphic control is bi-directionally linked. If the user manipulates the graphic control, a value in the spreadsheet cell that is linked to the graphic control changes in a corresponding fashion. Similarly, any change to the spreadsheet cell linked to the graphic control is reflected within the graphic control. With this tool, the user can apply graphic controls to the spreadsheet program without requiring the user be skilled in programming.

35 Claims, 10 Drawing Sheets

| | A | B | C | D | E | F | G |
|---|---|---|---|---|---|---|---|
| 1 | LINE 1 | 3 | | | | | |
| 2 | LINE 2 | | | | | | |
| 3 | LINE 3 | | | | | | |
| 4 | LINE 4 | | | | | | |
| 5 | : | | | | | | |
| 6 | LINE N | | LINE 1 | | | ↑ | |
| 7 | LINE N+1 | | LINE 2 | | | | |
| 8 | | | LINE 3 | | | | |
| 9 | | | LINE 4 | | | | |
| 10 | | | : | | | | |
| 11 | | 160 | LINE N | | | ↓ | |
| 12 | | | | | | | |
| 13 | | | | | | | |
| 14 | | | | | | | |

FIG. 2A  FIG. 2B

|   | A | B | C | D | E | F | G |
|---|---|---|---|---|---|---|---|
| 1 | LINE 1 | 3 | | | | | |
| 2 | LINE 2 | | | | | | |
| 3 | LINE 3 | | | | | | |
| 4 | LINE 4 | | | | | | |
| 5 | : | | | | | | |
| 6 | LINE N | | LINE 1 | | | ↑ | |
| 7 | LINE N+1 | | LINE 2 | | | | |
| 8 | | | LINE 3 | | | | |
| 9 | | | LINE 4 | | | | |
| 10 | | | : | | | ↓ | |
| 11 | | 160 | LINE N | | | | |
| 12 | | | | | | | |
| 13 | | | | | | | |
| 14 | | | | | | | |

*FIG. 3A*

|   | A | B | C | D | E | F | G |
|---|---|---|---|---|---|---|---|
| 1 | LINE 1 | 3 | | | | | |
| 2 | LINE 2 | | | | | | |
| 3 | LINE 3 | | | | | | |
| 4 | LINE 4 | | | | | | |
| 5 | : | | | | | | |
| 6 | LINE N | | LINE 3 | | | ↓ | |
| 7 | LINE N+1 | | LINE 1 | | | | |
| 8 | | | LINE 2 | | | | |
| 9 | | | LINE 3 | | | | |
| 10 | | | LINE 4 | | | | |
| 11 | | | : | | | | |
| 12 | | | LINE N | | | | |
| 13 | | 162 | LINE N+1 | | | | |
| 14 | | | | | | | |

METHOD AND SYSTEM FOR LINKING CONTROLS WITH CELLS OF A SPREADSHEET

This application is a file wrapper application, based on prior application Ser. No. 08/327,196, filed on Oct. 21, 1994 and now abandoned, the benefit of the filing date of which is hereby claimed under 35 U.S.C. §120.

FIELD OF THE INVENTION

The present invention generally relates to spreadsheets, and more specifically, to graphic controls for spreadsheets that enable values in one or more cells of a spreadsheet to be modified by a user manipulating a graphic control.

BACKGROUND OF THE INVENTION

Even casual users of spreadsheet programs have become accustomed to creating macros that automate tasks, which are frequently implemented in a spreadsheet. Although a macro can be created for a spreadsheet by writing each step as a program instruction, it is often easier for the average user to simply record the steps that will be carried out by the macro. To record a macro, the user selects commands and cells in the spreadsheet in the sequence necessary to implement the desired task. A macro can thus be created by a user who has no knowledge of programming.

If a person must create a macro or a procedure for a spreadsheet that is beyond the simplistic level that can be achieved by simply recording the steps, the user has had little choice but to learn the program language and syntax used in procedural modules of the spreadsheet. While the programming language included with some spreadsheet programs is relatively simple, many people are intimidated by the prospect of learning the commands and syntax of the language and consequently never progress beyond the level of recording macros for use in spreadsheets.

In an effort to encourage more people to write spreadsheet procedures, software companies that produce spreadsheet programs have attempted to simplify the languages in which macros and procedures are written. For example, in the Version 5 of the spreadsheet program EXCEL™, Microsoft Corporation includes a VISUAL BASIC application programming language module. VISUAL BASIC is relatively easier to learn than a traditional high level programming language such as C/C++ or even BASIC and enables a user to design custom interfaces that include graphic controls, with minimal programming skill. By including substantially the same VISUAL BASIC application module in its spreadsheet, data base, and word processing programs, Microsoft Corporation will ensure that users of all of the applications need only learn one language to create procedures in all of the applications. However, although the VISUAL BASIC language is relatively easy to learn and use, it is clear that many users will not even try to program without further encouragement.

One way to encourage a user to develop programming skills is to minimize the amount of programming required in developing simple procedures. A spreadsheet-based procedure might solicit input from a user, and based upon that input, the underlying spreadsheet program may recalculate the values in one or more cells of the spreadsheet. That result may be a chart or a table of data that shows one or more computed relationships between input parameters and data.

Graphic controls are often employed in a spreadsheet application. For example, a user of the spreadsheet application may be required to select an option from a drop-down box, enter a check in a check box, click on arrows in a spinner to increase or decrease a parameter value, or set a slider to indicate a parameter value. In a conventional spreadsheet program, inclusion of such graphic controls would require that the developer of the spreadsheet application write procedural code for each such graphic control. This procedural code would be required to indicate that a value in the spreadsheet is affected by the graphic control when the control is manipulated by a user. It would clearly be preferable to enable the developer to introduce graphic controls into a spreadsheet application without requiring that the developer write a program to define how the graphic control operates. The confidence derived from such an experience would tend to encourage the person in developing more sophisticated spreadsheet applications that require some programming skill. Furthermore, if a person sees that the graphic controls can easily be added directly to a spreadsheet or to a graph, it is more likely that the person will take further steps to learn the programming skills needed to achieve greater flexibility and create a more complex spreadsheet application.

To implement graphic controls in a spreadsheet application without requiring the developer to program, the underlying spreadsheet program should directly link a graphic control to a specific cell in a spreadsheet. The value set when the user manipulates the graphic control should directly affect this linked cell. Any formulas or charts that depend upon the value in the linked cell should also be automatically updated as the value in that cell is changed. No prior art spreadsheet programs include any provision for such an easily implemented link between a graphic control and a cell of the spreadsheet. Besides enabling user control of parameters in a spreadsheet to be more readily implemented than is possible in prior art spreadsheet programs, this feature would encourage users to develop programming skills.

SUMMARY OF THE INVENTION

In accordance with the present invention, a method is provided for enabling a user to graphically control a cell of a spreadsheet. The method includes the step of providing a toolbar on which is disposed a graphic representation of a control. The user is enabled to select the graphic representation of the control on the toolbar and position a copy of the control in a workspace selected by the user on a display. The workspace is preferably associated with the spreadsheet and comprises either a worksheet, a dialog sheet, a chart or a macro sheet. The user is enabled to link a cell of the spreadsheet to the control, causing a value in the cell to change when the user graphically manipulates the control.

Further, the method includes the step of enabling the user to position and size the control in the workspace. To size the control, the user selects a first position in the workspace as a first corner of the control. Then, by dragging a cursor in the display to a second position in the workspace, the user indicates a diagonally opposite corner of the control.

Another step of the method involves enabling the user to select a menu item that opens a dialog box in which the user identifies the cell to which the control is linked. This link comprises a property of the control. To provide an input in the dialog box that identifies the cell to which the control is linked, the user can select the cell in the spreadsheet with the cursor. Alternatively, the user can simply click in the formula bar box and then on a spreadsheet cell while the control is selected, thereby linking the control to that spreadsheet cell. In the preferred form of the invention, the control comprises one of a check box, an option button, a list box, a drop-down box, a combination list-edit box, a combination drop-down-edit box, a scrollbar, and a spinner. A change in the value of the cell to which the control is linked causes a corresponding change in the parameter of the control.

If the control comprises one of the list box, the drop-down box, the combination list-edit box, and the combination drop-down-edit box, the method further comprises the step of enabling the user to indicate a range of cells in the spreadsheet as entries in the control. Selection of one of the entries in the range of cells causes a numeric value to be returned in the cell to which the control is linked. The numeric value corresponds to an ordinal number of the entry selected.

If the control comprises a scrollbar, the method further comprises the step of enabling the user to specify a start value and an end value for a range of values encompassed by the scrollbar. The start value and the end value correspond to one extreme position and an opposite extreme position of a slider in the scrollbar. Further, for the scrollbar, the method includes the steps of enabling the user to specify an incremental change in the value each time that the user clicks on an arrow of the scrollbar, and to specify an incremental change in the value each time that the user pages the scrollbar.

If the control comprises a spinner, the method further comprises the steps of enabling the user to specify a start value and an end value for a range of values encompassed by the spinner as the user selects one of two arrows displayed in the spinner, and to specify an incremental change in the value that will occur each time that the user graphically manipulates one of the arrows.

Should the control comprise an option box in a group of option boxes, the value in the cell to which the control is linked comprises an ordinal number of the option box within the group. If the control comprises a check box, the cell to which the check box is linked has a "true" value if the user enters a check into the check box and a "false" value if the check is not entered in the check box. In this case, the check box displays a check if the user enters a non-zero number in the cell to which the check box is linked, but does not display a check if the user enters a zero in the cell.

It is also preferred that the method include the step of enabling the user to link one cell of the spreadsheet to a plurality of controls. A change to the value of the cell causes the plurality of controls to change in a corresponding manner. Finally, if any other cell in the spreadsheet includes a formula that depends upon the value of the cell to determine a result, that result is repetitively recalculated as the user continues to manipulate the control linked to the cell.

A further aspect of the present invention is a spreadsheet system. The spreadsheet system includes a personal computer having a central processing unit, a memory, a display screen, a user interface, and a non-volatile storage unit. The memory stores program instructions that control operation of the central processing unit so that it functions as a spreadsheet application. These program instructions further cause the central processing unit to provide a plurality of control icons on the display screen in order to enable a user to select a control icon with the user interface and to position the control icon in a workspace associated with the spreadsheet. The workspace comprises one of a worksheet, a chart, a dialog sheet, and a macro sheet appearing on the display screen. In addition, the program instructions cause the central processing unit to enable the user to specify a cell in the spreadsheet to which the control icon selected by the user is linked. The user can then vary a value of the cell by changing a parameter of the control icon. To change the parameter, the user manipulates the control icon. Other aspects of the spreadsheet system are generally consistent with the functions of the method steps discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 2A is a Forms button bar that is displayed in a spreadsheet display screen, to enable a user to select a graphic control, in accordance with the present invention;

FIG. 2B is a Properties Dialog box that is selectively displayed to the user to enable properties of the graphic control to be selectively set by the user;

FIG. 3A is portion of a spreadsheet, in which a list box is linked to a cell in the spreadsheet;

FIG. 3B illustrates a portion of a spreadsheet and a drop-down box that is linked to a cell in the spreadsheet;

FIG. 3C shows a portion of a spreadsheet and a scroll bar that is linked to a cell in the spreadsheet;

FIG. 3D is a portion of a spreadsheet, showing a spinner that is linked to a cell in the spreadsheet;

DESCRIPTION OF THE PREFERRED EMBODIMENT

Figure 1A:
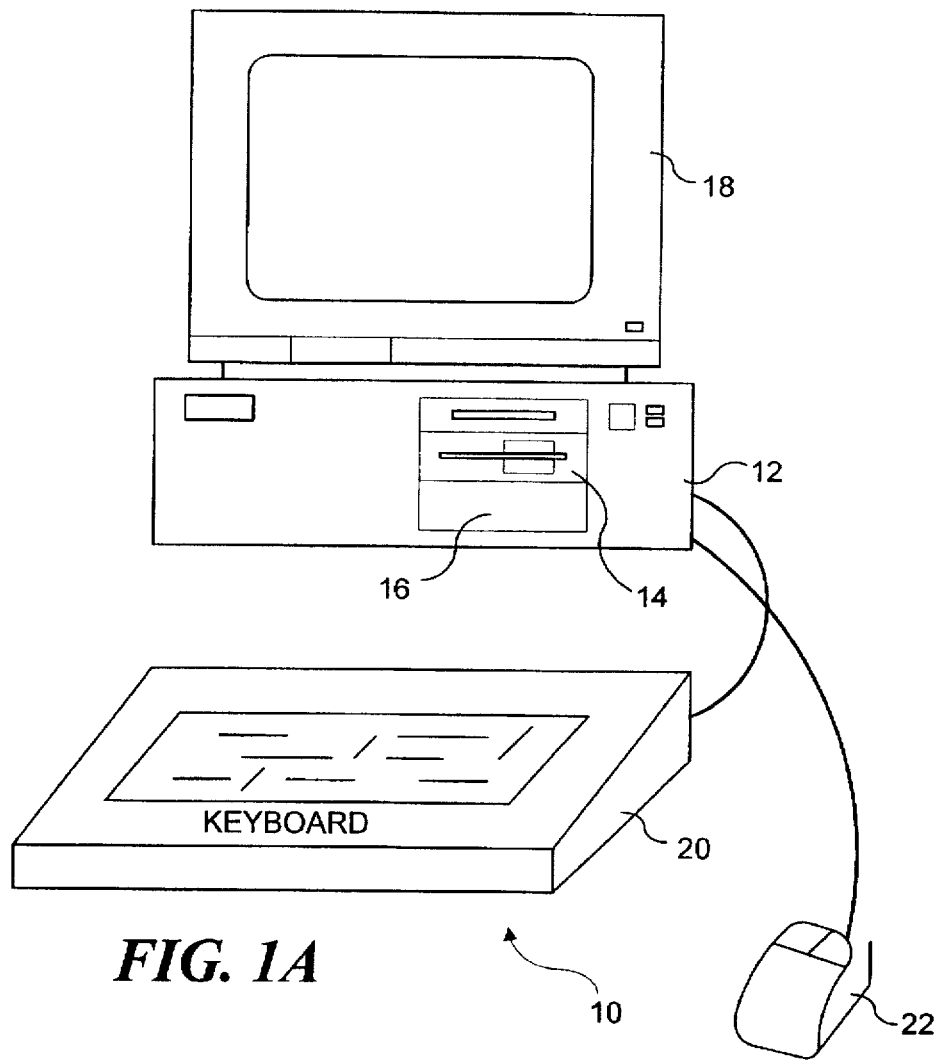
FIG. 1A is a schematic diagram of a personal computer suitable for executing the software that implements the present invention.
Figure 1B:
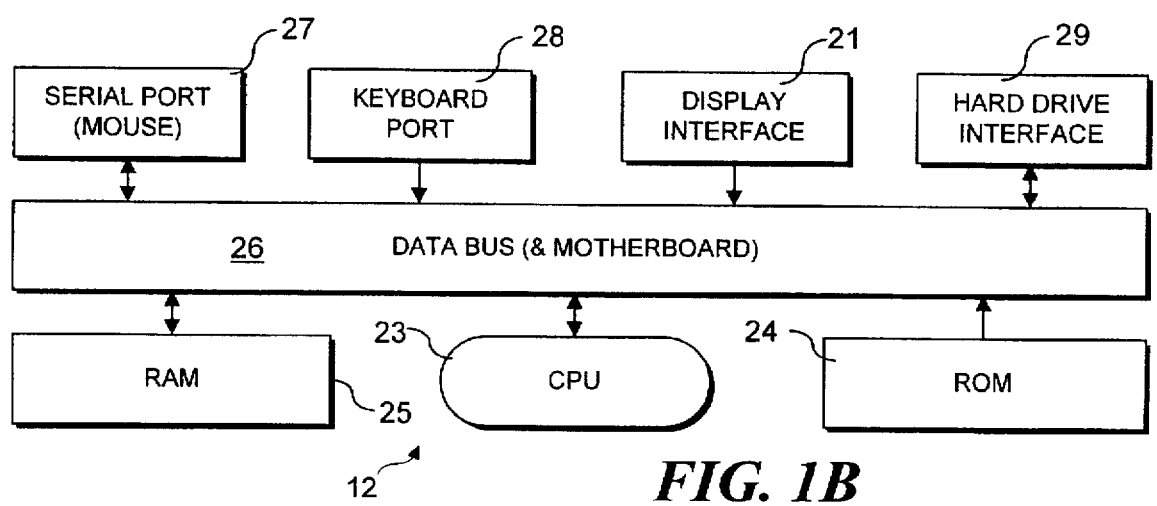
FIG. 1B is a schematic block diagram showing some of the components that comprise the processor chassis of FIG. 1A.

The present invention is typically implemented on a general purpose personal computer 10 as shown in FIG. 1A. Personal computer 10 includes a processor chassis 12 in which, as shown in FIG. 1B, are installed a data bus (and motherboard) 26 on which are mounted a central processing unit (CPU) 23, an associated read only memory (ROM) 24 and a random access memory (RAM) 25. Various other circuit boards of the type commonly used in personal computers are not shown. In order to store programs and data in a non-volatile format, personal computer 10 includes a hard drive 16, which is coupled to CPU 23 through a hard drive interface 29 that is connected to data bus 26. Similarly, non-volatile storage is provided on floppy disks using a floppy drive 14 so that application programs can be loaded into the personal computer and data stored on a floppy disk (not shown) can be transferred to other computers. A conventional computer display monitor 18 is included for displaying both text and graphic objects to the user and is coupled to the data bus through a display interface 21. Also coupled to the data bus through a keyboard port 28 is a conventional keyboard 20, enabling the user to input text and to control application programs. A more expedient method for manipulating a cursor and for selecting options is provided by a mouse 22, which is coupled to data bus 26 through a serial port 27. Other types of pointing devices can be used as an alternative to mouse 22.

Although a generally conventional desktop personal computer 10 is illustrated in FIG. 1A, it will be appreciated that the present invention can also be practiced at a network terminal or workstation, or using a laptop personal computer.

The preferred embodiment of the invention that is disclosed below is included in Microsoft Corporation's EXCEL™ Version 5 spreadsheet program and is designed to run under Microsoft's WINDOWS 3.1, WINDOWS FOR WORKGROUPS 3.11, and WINDOWS NT graphic operating systems. The invention is also implemented in other graphic operating systems, such as Apple Computer's SYSTEM 7.0™.

The Microsoft EXCEL spreadsheet program is normally stored on hard drive 16 or on a server to which personal computer 10 is connected in a local area network. When the spreadsheet program is run, it is loaded into RAM 25 as a series of machine instructions that are executed by CPU 23. These machine instructions within the spreadsheet program files implement the present invention on the personal computer. Most computer users know that a spreadsheet program generally enables a user to organize data and variables in cells on a spreadsheet and to perform calculations on the data, yielding results that are often presented in tabular form or graphically in a chart. The cells of the spreadsheet are referenced by their row and column position or by associated labels. In Microsoft EXCEL, one or more spreadsheets can be grouped into a workbook, along with charts that display data in a variety of formats. Workbooks can also include dialog sheets, which include dialog boxes to enable the user to input data for control of macros or program modules associated with the workbook.

As noted above, the occasional user of a spreadsheet program typically does not develop the ability to write macros or procedures to control the data presented in spreadsheets and charts. However, the present invention enables a relatively unskilled spreadsheet program user to incorporate one or more of a plurality of different types of graphic controls either on a spreadsheet, on a dialog sheet, on a chart, or on a macro sheet (used in prior versions of the Microsoft EXCEL spreadsheet program). Although these graphic controls can be used in connection with macros or programmed procedures to carry out more complex operations, the user is not required to employ any programming to make use of the graphic controls in accordance with the present invention. It is hoped that a user may be encouraged to develop some programming ability, encouraged by the simplicity with which the graphic controls are implemented.

In the preferred form of the invention included in the Microsoft EXCEL spreadsheet program, a variety of graphic controls are made available to the user for selection and positioning within the selected workspace. Although this invention is certainly not limited to the specific graphic controls employed in the preferred embodiment represented by the EXCEL spreadsheet program, the graphic controls that are included and discussed below provide an excellent example of the power of this invention and its simplicity of use.

The features in the Microsoft EXCEL spreadsheet program include the option to select and customize various button toolbars that will be displayed on the computer screen. One of the default button toolbars included in the spreadsheet program is a Forms toolbar 30, which is shown in FIG. 2A. The default Forms toolbar provided in the Microsoft EXCEL spreadsheet program includes a plurality of buttons or icons representing graphic controls and other objects. When the Forms toolbar is open, the user can select a graphic control to be inserted into a desired workspace of the spreadsheet program.

FIG. 2A illustrates the default layout for the buttons on Forms toolbar 30. Only the buttons of interest to the present invention are discussed below. These buttons include a check box button 32, an option button 34, and a group box button 36, which is typically used for grouping a plurality of option box controls together so that selection of one of the option boxes deselects any other option box within the common grouping. The group box can also be used in a dialog box, chart, or on a spreadsheet, for grouping other types of graphic controls to simplify the layout of the spreadsheet controls.

Other graphic control buttons in the Forms toolbar include a list box button 38, a drop-down box button 40, a combination list-edit box button 41, a combination drop-down list edit box button 13, a scrollbar button 42, and a spinner button 44. A properties button 46 is included and is used to open a Format Object dialog box that allows a user to set various parameters for the graphic controls, as shown in FIGS. 2B through 2H.

Forms toolbar 30 simplifies the selection and inclusion of a specific graphic control on a spreadsheet, in a chart, or on a dialog sheet. To insert a graphic control into one of these workspaces, the user simply selects the button on the forms toolbar that represents the desired graphic control to be inserted. In order to select one of the buttons, the user moves mouse 22 to manipulate a cursor that appears on the display screen so that it overlies the desired graphic control button. The user then selects that control by pressing the mouse select button (typically the left button on the mouse unless the user has reversed the functions of the mouse buttons). Once one of the buttons on the Forms toolbar has been selected in this manner, the user can move the cursor to the point on the display screen within the spreadsheet, chart, or dialog sheet at which the graphics control is to be inserted.

The graphic control is inserted by depressing and holding the mouse select button and moving the mouse. As the user moves the mouse, a rectangle appears on the screen that is indicative of the size of the graphic control. Once the size has been established as desired by appropriately moving the mouse, the mouse select button is released. The graphic control then appears on the display screen selected in the area defined by the rectangle; the size of the graphic control can be further adjusted using sizing "handles" that appear at the corners and midpoints of the lines defining the graphic control. To change the size or shape of the graphic control, the user positions the cursor on one of the handles and presses and holds the mouse select button, enabling the user to drag the handle to achieve the desired shape or size. In addition, the graphic control can be moved about on the display screen by positioning the cursor within the graphic control, depressing the select button, and then moving the cursor to the desired new position.

Once the graphic control is deselected by clicking the mouse select button on another part of the display screen, it can be reselected by clicking the other mouse button (typically the right mouse button) while the cursor is on the graphic control, or by holding down on the Control key while the mouse select button is clicked. Clicking on the graphic control with the right mouse button also opens a drop-down menu of commands listing various actions that are applicable to the graphic control.

Dimensions of the graphic control can affect the appearance of the graphic controls. For example, the relative horizontal (from left to right on the screen) and vertical (from top to bottom on the screen) dimensions of the scrollbar graphic control determine whether the scroll slider moves vertically or horizontally. Specifically, if the scrollbar is defined by a rectangle that is substantially longer horizontally than vertically, the scrollbar will extend horizontally across the display screen. Conversely, if the horizontal dimension of the scrollbar is substantially shorter than its vertical dimension, the scrollbar will extend vertically on the display screen.

If a graphic control is positioned on a chart while the chart is selected, it will appear on top of the chart at all times. However, the visibility of a graphic control positioned on a chart relative to the chart can be changed using the Send-To-Back or Bring-To-Front commands that are displayed on the menu normally activated with the other (right) mouse button, or under the Format, Placement selections of the Main Menu at the top of the display screen.

After the selected graphic control is positioned on the spreadsheet, chart, dialog sheet, or macro sheet as desired, the properties for the graphic control are set by selecting properties button 46, which opens the Format Object dialog box. The Format Object dialog box includes a plurality of dialog tabs, which if selected, open what will be referred to in this discussion as dialog boxes. One of these dialog tabs opens the Properties dialog box. In FIG. 2B, a Properties dialog box is shown that is common to all of the graphic controls if the graphic control is disposed on a spreadsheet, or dialog sheet. The Format Object dialog also includes one or more other tabs that can be selected with the mouse to open other dialog boxes in which additional parameters can be set by the user, including a Protection tab 54 and a Control tab 56. The Protection tab is not displayed when the Format Object dialog box is opened for a graphic control disposed in a chart. As explained below, the options that are user selectable on the Control dialog box depend upon the particular graphic control with which the Control dialog box is associated.

A Properties dialog box 50 includes three option boxes 58, 60, and 62 that enable the user to determine how the graphic control object is treated when cells on the spreadsheet are positioned and sized. Selecting option box 58 enables the user to indicate that the object should be moved and sized with the cells; control button 60, if selected, indicates that the object should be moved but not sized with the cells on the spreadsheet; and, option box 62 allows the user to indicate that the object should not be moved or sized with the spreadsheet cells. In addition, a check box 64 is provided to indicate whether the graphic control object should be printed when the spreadsheet is printed. If the graphic control is positioned on a chart, selection of these various options respectively determines whether the graphic control is moved and/or sized with the chart, and whether it is printed with the chart.

Figure 2C:
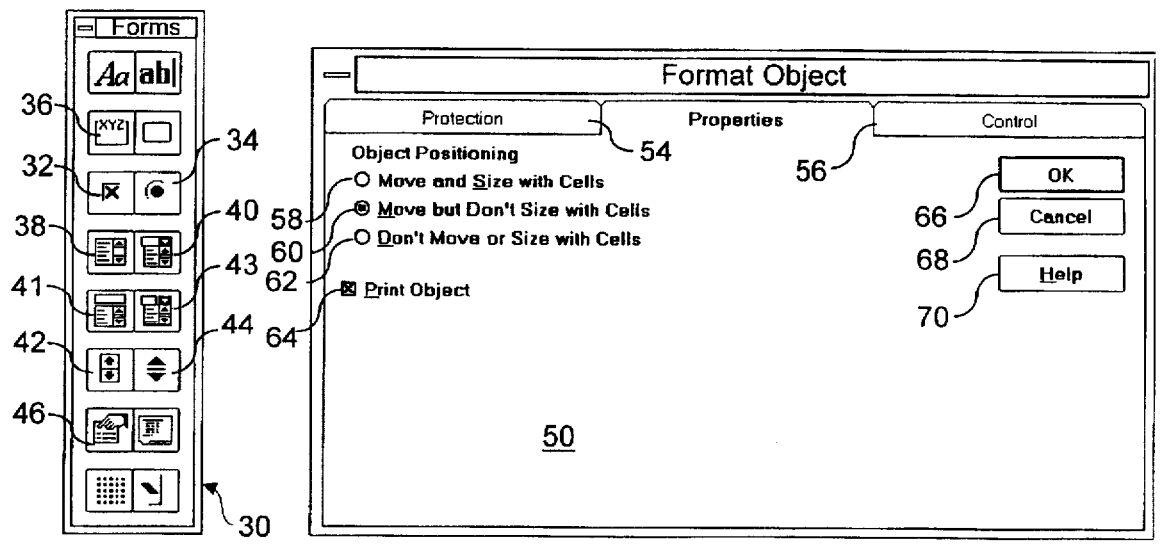
FIG. 2C is a Control Dialog box that is selectively displayed to the user, enabling control parameters for a list box graphic control to be selected.
Figure 2C:
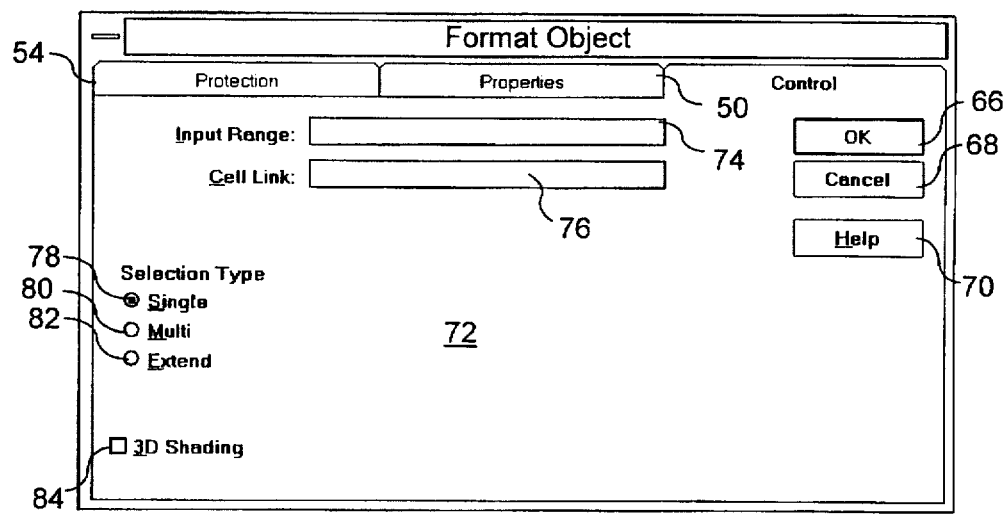

Assuming that the graphic control currently selected is a list box, selection of Properties button 46 on Forms toolbar 30 opens a Control dialog box 72, as shown in FIG. 2C. It is helpful to discuss the Control dialog box in connection with a list box 160, which is shown in FIG. 3A. In FIG. 2C, an input range box 74 allows the user to indicate specific cells within a spreadsheet that are used for the entries within the list box. The quickest method for indicating the range of cells is to sweep the mouse cursor over the cells while the mouse select button is depressed. Alternatively, the range can be entered as text. To indicate the range of cells shown in list box 160 of FIG. 3A, a user would enter A1:A7 within input range box 74 of FIG. 2C.

The user is also presented with a cell link box 76, as shown in FIG. 2C, for indicating the particular cell of the spreadsheet to which the list box graphic control is linked. Entry of B1 in cell link box 76 of FIG. 2C produces the result shown in FIG. 3A. As shown in list box 160, line 3 is highlighted, indicating that it has been selected. Since line 3 corresponds to the third entry within the list box, spreadsheet cell B1 within FIG. 3A includes a numeral 3. Had the user instead selected the second entry, i.e., line 2 in the list box, the number 2 would appear in spreadsheet cell B1 of FIG. 3A, corresponding to the ordinal number of the selected entry. It should also be noted that list box 160 includes a scrollbar on the right side, because the (vertical) size of the list box defined by the user enables fewer lines to be shown than indicated within the input range box.

Option boxes 78, 80, and 82 are provided to enable the user to determine whether a single entry in the list box can be selected, or whether multiple entries can be selected. Option box 82 allows multiple entries in sequence to be selected as an extended selection. Only option box 78 is meaningful in regard to the present invention, since it must be selected in order for the spreadsheet cell entered within cell link box 76 to indicate the ordinal number corresponding to the specific single entry that has been selected by the user in the list box. Option boxes 80 and 82 are useful when the graphic control provides input to a VISUAL BASIC application program.

A check box 84 can be selectively checked by the user to improve the appearance of the graphic control by applying three-dimensional shading to the contours of the graphic control. Boxes 66, 68, and 70 are included in all of the Format Object dialog boxes to enable the user to indicate that the parameters have been entered by selecting OK (box 66), or to Cancel the selection of parameters (box 68). In addition, Help box 70 can be selected to open a help screen that explains the various parameters selectable within the dialog boxes.

Figure 2D:
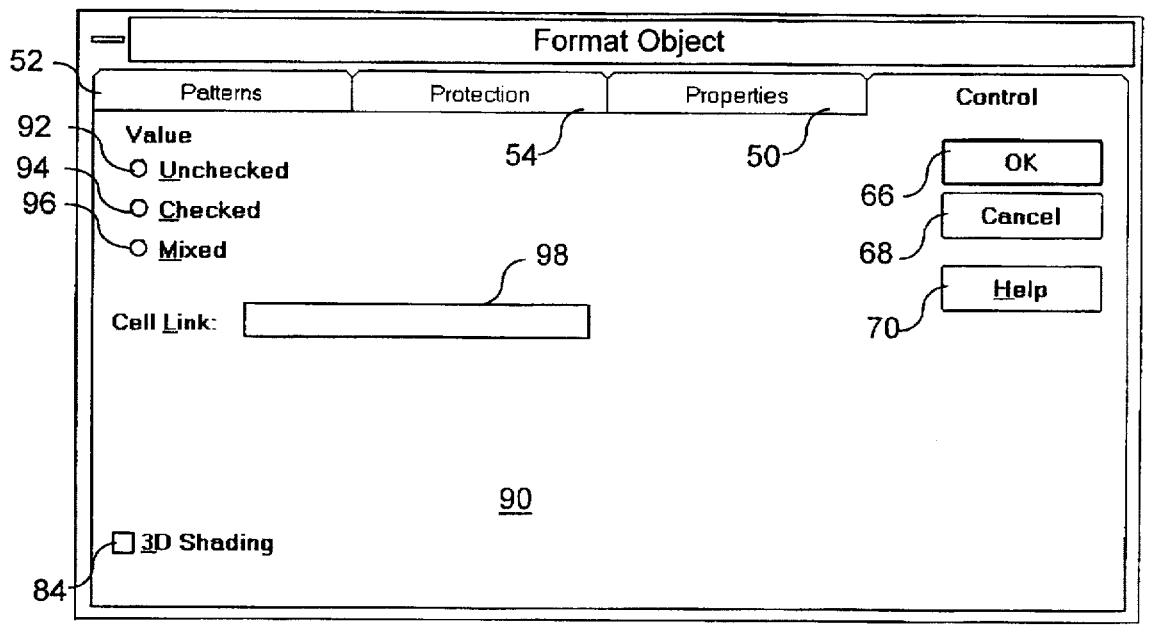
FIG. 2D is a Control Dialog box that is selectively displayed to the user, enabling control parameters for a button or check box graphic control to be selected.
Figure 2E:
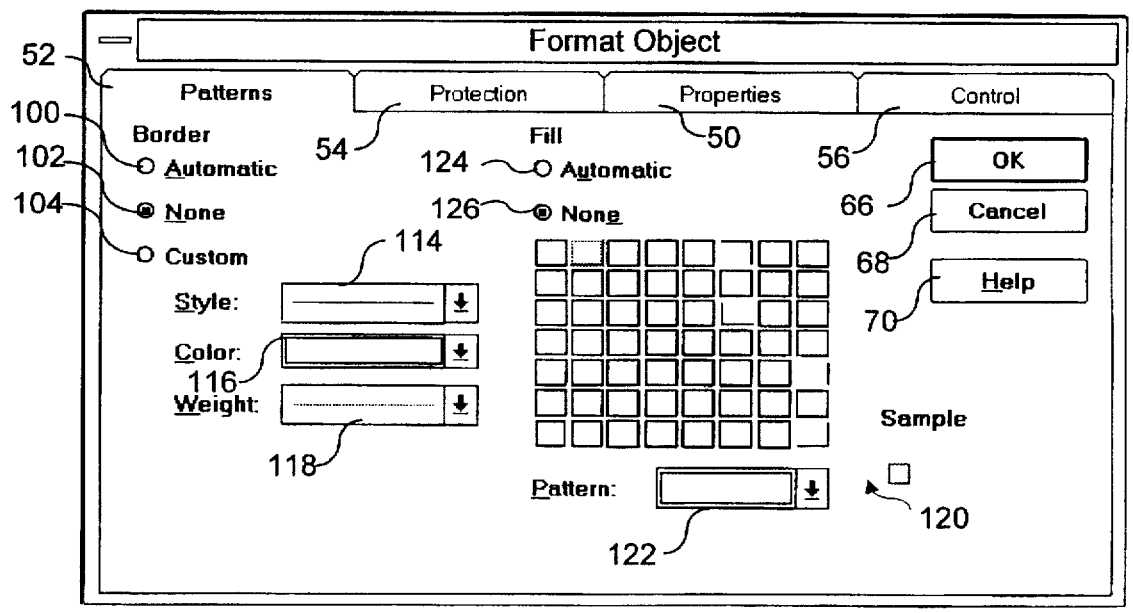
FIG. 2E is a Patterns Dialog box that is selectively displayed to the user, enabling the user to select border, pattern, and color parameters for the button or check box graphic control.

Referring now to FIG. 2D, a Control dialog box 90 is illustrated. This Control dialog box is associated with the check box graphic control. Control dialog box 90 includes option boxes 92, 94, and 96, which are used for setting the default state or value of the selected check box. If option box 96 is chosen to indicate "Mixed," the spreadsheet cell that is linked to the graphic control displays "N/A" (not applicable) in its initial state. However, if the user selects the check box graphic control, an "X" appears in the check box and the spreadsheet cell that is linked to the check box displays the word "TRUE." Selecting the check box again causes the X in the check box to disappear, and the spreadsheet cell linked to the check box to read "FALSE." Option box 92 selects an "Unchecked" initial value, and option box 94 selects a "Checked" initial value for the check box graphic control.

The Control dialog box for the option box graphic control is identical to Control dialog box 90, with the exception that option box 96 (Mixed) is grayed (indicating that the option is not available). Since only one option box in a group can be selected, a mixed default value would be meaningless for this type of graphic control. Other elements of the option box Control dialog box are identical to check box Control dialog box 90, shown in FIG. 2D.

Both the check box and the option box Format Object dialog boxes include a Pattern dialog box, which is not applicable to any of the other graphic controls in the preferred embodiment of the invention. The Pattern dialog box, opened by selecting a Patterns tab 52, enables the user to control border and fill properties for the rectangular area surrounding the check box or option box graphic control. Under the Border heading of the Pattern dialog box, option boxes 100, 102, and 104 enable the user to indicate whether the border is automatically determined (option box 100), whether no border is applied (option box 102), or whether a Custom border is to be applied (option box 104). If option box 104 is selected to indicate that a Custom border is desired, the user is then enabled to select a style for the border in a drop-down list box 114, a color for the border in a drop-down list box 116, and a weight for the border in a drop-down list box 118. In addition, option boxes 124 and 126 enable the user to select between an automatic fill or no fill for the rectangular area surrounding the check box or option box graphic control. If automatic option box 124 is selected, the user can select one of a plurality of colors from an underlying color chart 120. In addition, a specific pattern for the background surrounding the check box or option box graphic control can be selected by the user from a drop-down list box 122.

Figure 2F:
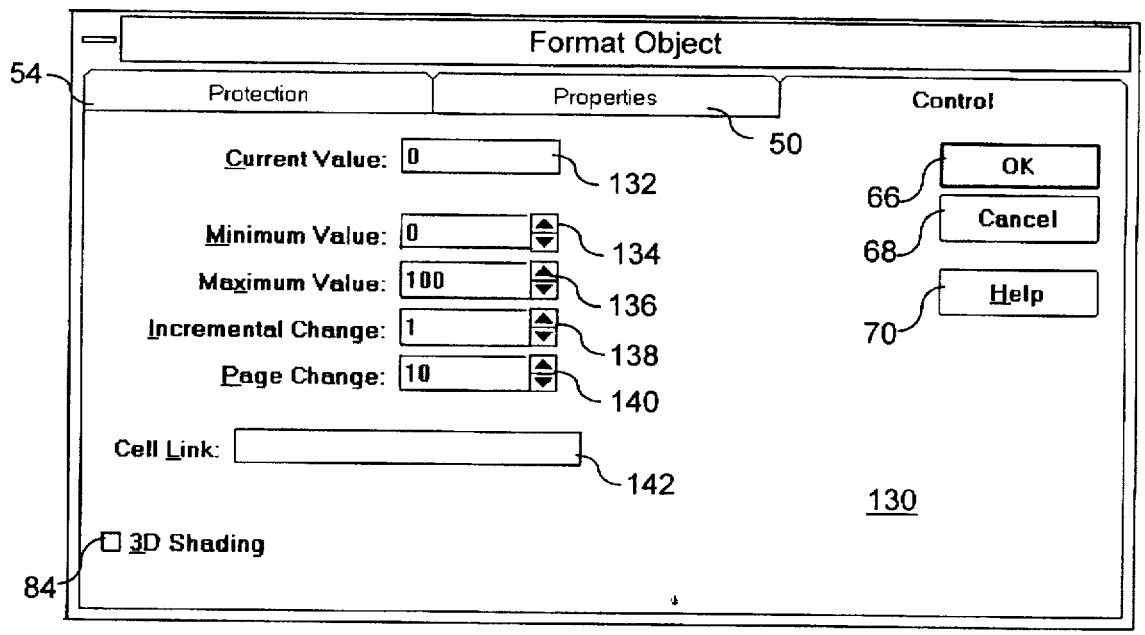
FIG. 2F is a Control Dialog box that is selectively displayed to the user, enabling control parameters for a scrollbar graphic control to be entered or selected by the user.
Figures 3C, 3D:
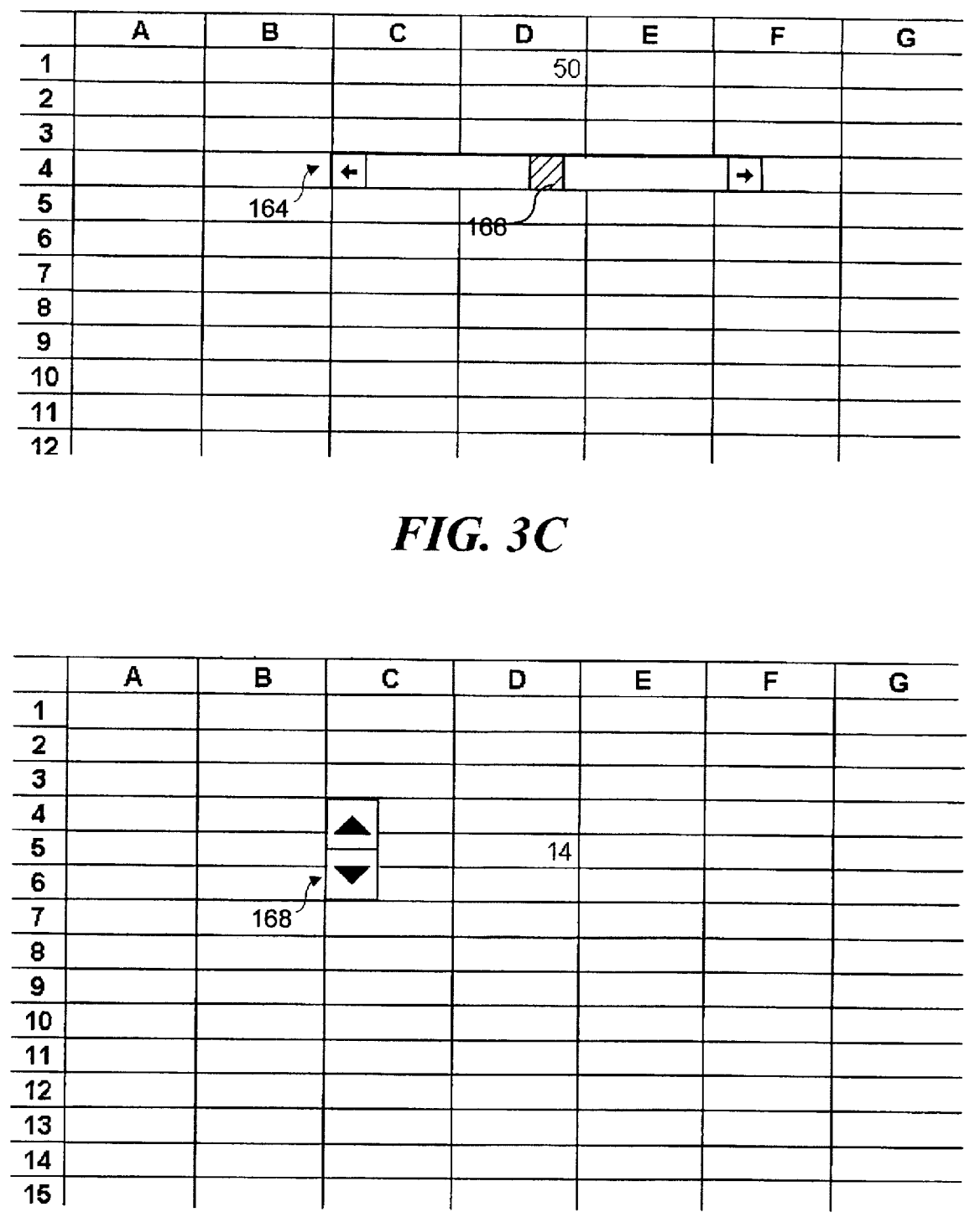

Referring now to FIG. 2F, a Control dialog box 130 is shown for use in connection with a scrollbar graphic control, such as a scrollbar 164, which is shown in FIG. 3C. A current value box 132 is included in Control dialog box 130 to enable the user to set the initial value for the position of the slider in the scrollbar. The minimum value of the range selectable by the scrollbar is set using a spinner 134 or by entering the numeric value directly. Similarly, the maximum value for the scrollbar is set, using a spinner 136, or by direct entry of a value. As shown in FIG. 2F, the minimum and maximum values for the scrollbar shown in FIG. 3C are zero and 100, respectively. Each click on the arrows disposed at the end of the scrollbar increases or decreases the value in the spreadsheet cell linked to the scrollbar graphic control by the amount indicated in the "Incremental Change" input box, which is modified using a spinner 138. Clicking to the left or the right side of a slider 166 in scrollbar 164 (FIG. 3C) is called a "Page Change." The extent to which the slider moves and the corresponding value changes when a Page Change occurs is entered by the user in a Page Change box and controlled by a spinner 140, as shown in FIG. 2F.

With reference to FIG. 3C, it will be noted that slider 166 is positioned midway between the two ends of scrollbar 164. Spreadsheet cell D1 has been entered into Cell Link box 142 of the scrollbar Control dialog box, so that a value 50, which corresponds to the midpoint position of slider 166 appears in spreadsheet cell D1. As slider 166 is moved toward the right, the value in spreadsheet cell D1 increases; conversely, this value decreases as the slider is moved in the opposite direction. Any formulas or other spreadsheet cells depending upon the value of cell D1 within the spreadsheet will change in a corresponding fashion as slider 166 is moved. Conversely, if a user enters a different value into spreadsheet cell D1, either directly by changing the value of that cell, or indirectly by changing other values that are in turn linked to cell D1 so that its value changes indirectly, slider 166 will change in a corresponding fashion. It can be particularly helpful to link a graphic control, such as slider 164 to a cell of the spreadsheet upon which a chart depends, so that the chart is redrawn to reflect each successive change of the slider position. This bi-directional linkage is also a characteristic of the other types of graphic controls.

Figure 2G:
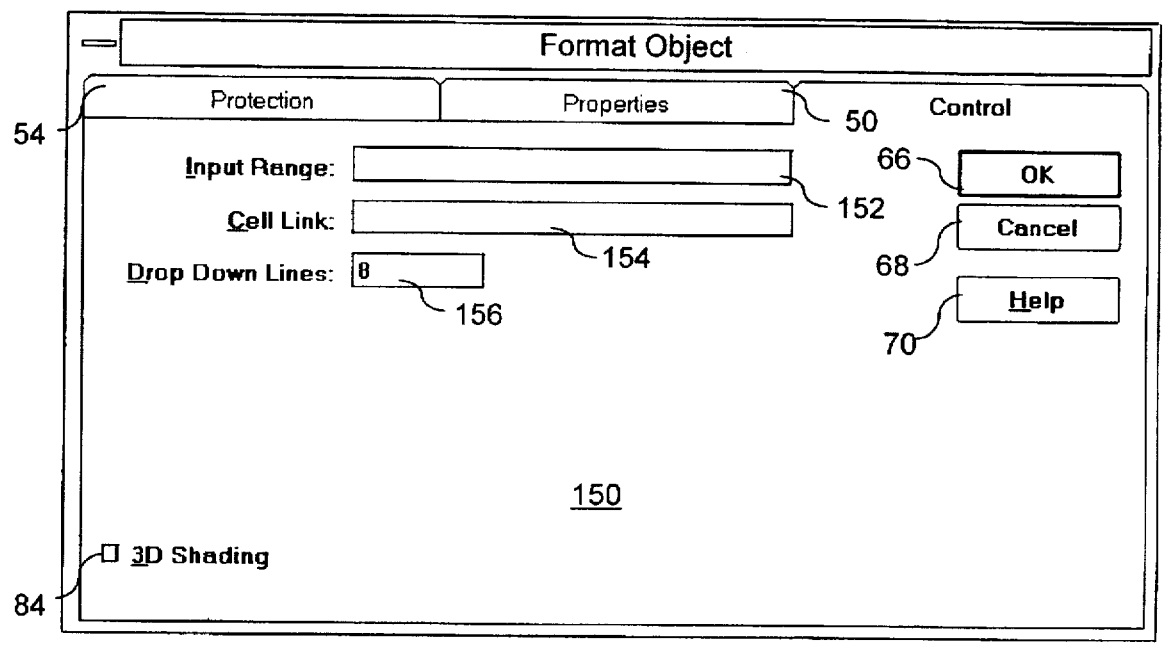
FIG. 2G is a Control Dialog box that is selectively displayed to the user to enable parameters for controlling the drop-down or drop-down combo graphic control to be set by the user.

FIG. 2F illustrates a Control box 150, which is used to determine certain parameters for a drop-down box graphic control 162, as shown in FIG. 3B. In this Control dialog box, an input range box 152 is included for entry of a range of spreadsheet cells that will be displayed when the user selects the drop-down box arrow (disposed on the right side of the line). A drop-down lines box 156 allows the user to enter the number of lines that should be displayed when the drop-down action is activated (by selecting the arrow at the right end of the top line). If fewer lines are entered within drop-down lines box 156 than appear within the input range selected in input range box 152, a scrollbar appears on the right side of the drop-down listing, enabling the user to scroll down in order to access lines that are not initially displayed. For the example of FIG. 3B, the input range is A1:A7, but can be set to include either more or fewer spreadsheet cells. A cell link box 154 is included within Control dialog box 150, as shown in FIG. 2G, to enable the user to identify the spreadsheet cell that is linked to the drop-down graphic control box. This linked cell can be identified either by row and column or by selecting it with the mouse in the spreadsheet.

Referring to the example in FIG. 3B, spreadsheet cell B1 is linked to drop-down list graphic control 162. In the example illustrated, the user has selected the third line or entry displayed in the graphic control, causing the text of that entry to be replicated in the top line of the graphic control. Since the third line of the displayed entries has been selected, the ordinal number 3 appears in spreadsheet cell B1 of FIG. 3B.

Figure 2H:
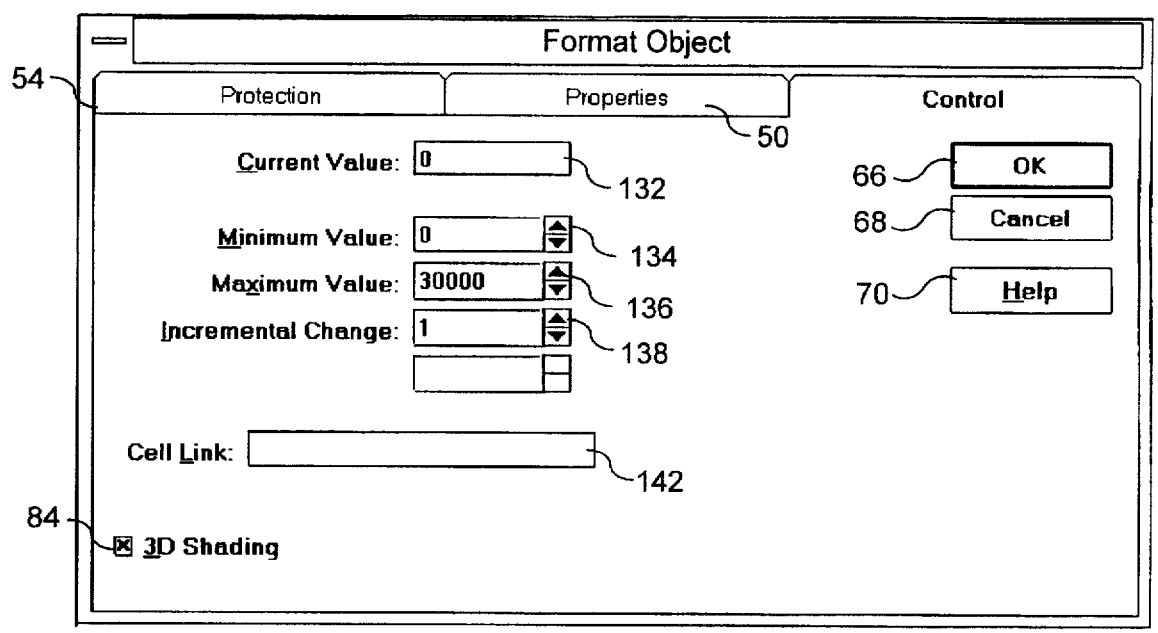
FIG. 2H is a Control Dialog box that is selectively displayed to the user, to enable parameters for control of a spinner graphic control to be set by the user.

The Control dialog box for a spinner is illustrated in FIG. 2H. An example of a spinner graphic control 168 is shown in FIG. 3D. A current value box 132 in FIG. 2H enables the user to set an initial default value that appears within the spreadsheet cell linked to the spinner graphic control, as indicated in a cell link box 142. In the example shown in FIG. 3D, spreadsheet cell D5 is linked to spinner graphic control 168. The upward and downward pointing arrows of the spinner enable the user to change the value in the spreadsheet cell that is linked to the spinner graphic control incrementally between a minimum and a maximum value. The minimum value is set with a spinner 134 in the Control dialog for the spinner graphic control, and the maximum value is set by a spinner 136. Alternatively, the minimum and maximum values can be directly entered. Each click on one of the upward or downward pointing arrows comprising the spinner graphic control changes the value in the linked cell by an incremental amount. The value for this Incremental Change is set by a spinner 138 in Control dialog box shown in FIG. 2H, or is directly entered by the user.

As noted in each of the FIGS. 2A through 2H, the user has an option for selecting a Protection tab 54, that opens a Protection dialog box (not shown). A single check box within the Protection dialog box can be checked to indicate that the graphic control associated with the Protection dialog box is to be locked. Locking the graphic control has no affect unless the spreadsheet is protected by choosing Protection from the Tools menu, and then choosing "protect sheet." By protecting the control (and the spreadsheet with which the graphic control is associated), the user can prevent others from changing the properties and parameters associated with the graphic control and prevent the graphic control from being moved, resized, or deleted. Since protection of the associated spreadsheet is controlling, the check box for Locked is checked in the default.

In the preferred embodiment, the combination list-edit box graphic control and the combination drop-down edit box graphic control can only be inserted into a dialog sheet—but not into a spreadsheet or into a chart. However, it is contemplated that each of these combination graphic controls be insertable in spreadsheets and in charts, just as the other graphic controls in the present preferred embodiment are. The Control dialog box for the combination list-edit box graphic control is the same as Control dialog box 72, which is used for the list box graphic control. Similarly, the Control dialog box for the combination drop-down edit box graphic control is the same as Control dialog box 150, which is used for the drop-down box graphic control.

Figure 4:
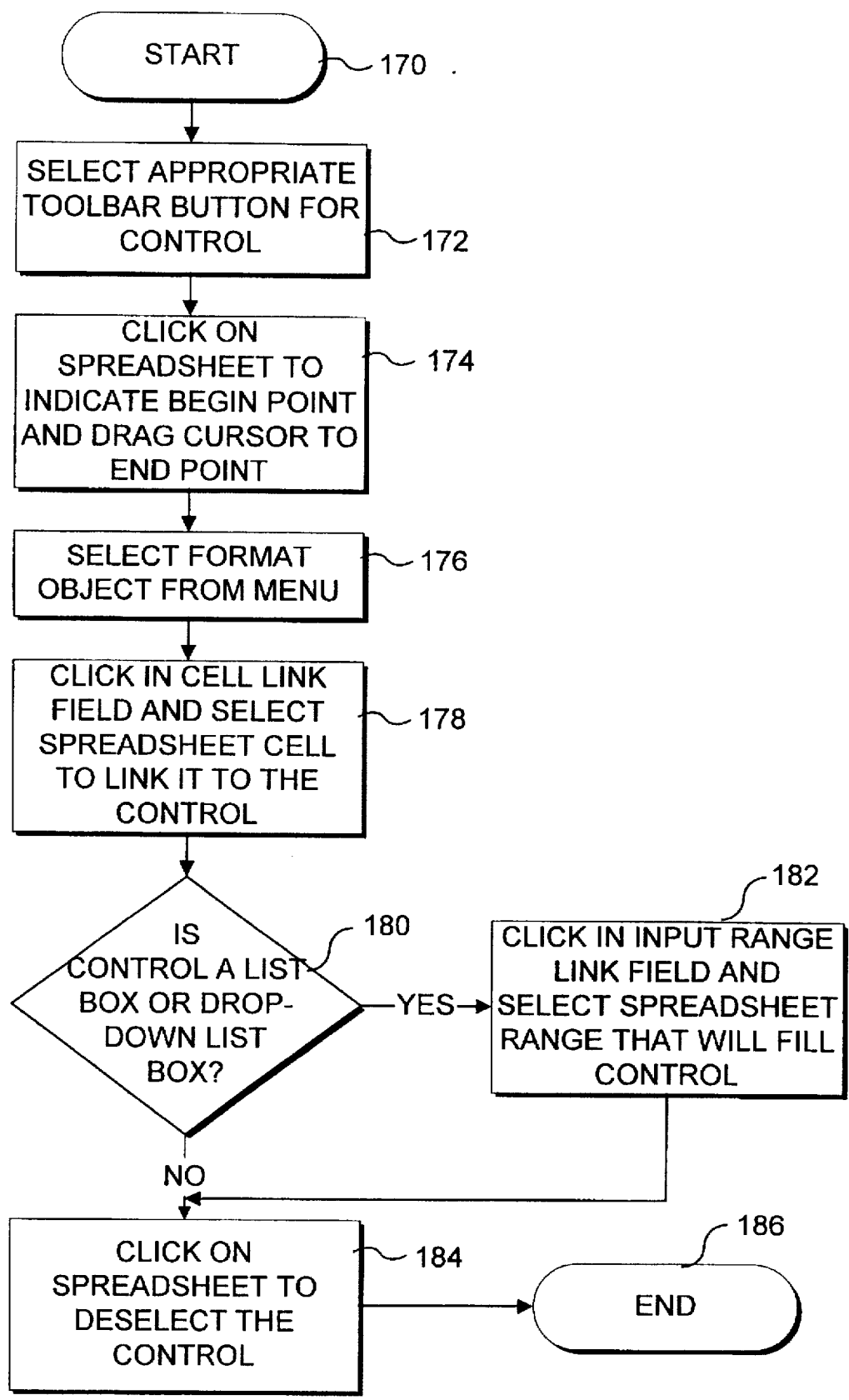
FIG. 4 is a flow chart illustrating the logical steps implemented when a user selects one of the graphic controls from the Forms button toolbar and positions the graphic control on a spreadsheet and links it to cell(s) in the spreadsheet.

The steps involved in implementing the present invention are discussed in connection with several flow charts. Beginning with FIG. 4, the logical steps implemented by the program to enable a user to select a graphic control and position it within a spreadsheet, dialog sheet, or chart are illustrated beginning at a Start block 170. In a block 172, the user selects an appropriate toolbar button from the Forms toolbar (FIG. 2A) that will be used to insert a graphic control into the selected workspace. As noted above, selection of the graphic control button is carried out using mouse 22.

In a block 174, having selected the button corresponding to the specific graphic control that will be used, the user clicks on the spreadsheet at a point corresponding to the desired position of one corner of the graphic control. A rectangle representing the size and shape of the graphic control is then defined as the user holds the select button on the mouse or keyboard and drags the cursor to an end point, which establishes a diagonally opposite corner of the rectangle defining the dimensions of the graphic control. When the user releases the select button on mouse 22, the perimeter of the graphic control is defined by lines that include handles for changing its dimension in one or both directions. Further, as also noted above, the user can position the cursor within the perimeter of the graphic control and again depress the select button, enabling the graphic control to be moved about on the spreadsheet, chart, or dialog sheet.

In a block 176, the user then selects Format Object from the menu on the top of the screen, or from a list of menu items that is obtained by depressing the right button on the mouse, or by selecting the properties button on the Forms toolbar. When the Format Object dialog box opens, the user is enabled to select the Control or Properties dialog box (or other dialog boxes, depending on the type of graphic control selected) to enable the user to set the parameters for the graphic control, as discussed above. In accordance with a block 178, the user clicks in the cell link field (or box) and selects the spreadsheet cell to be linked to the graphic control (or directly enters the cell row and column). The value within this linked cell will subsequently change as the graphic control is manipulated by the user. Alternatively, the user can select the control with the mouse select button, move the cursor to the formula bar box at the top of the screen and click with the mouse select button, and then move the cursor to the spreadsheet cell that is to be linked to the graphic control and click the mouse select button. The row and column for the spreadsheet will then be entered in the formula bar box and will appear in the linked cell box of the Format Object dialog box, when displayed on the screen.

In a decision block 180, the logic determines if the graphic control selected is a list box or a drop-down list box (these steps also apply to the corresponding combination edit box graphic controls). If so, a block 182 enables the user to click in the input range link field of the control dialog box and then select the spreadsheet range that will be used for providing the entries within the list box or drop-down list box. Conversely, if the response to decision block 180 is negative, or after block 182 is completed, a block 184 enables the operator to click on the spreadsheet to deselect the control. The control must be deselected so that it can be manipulated to set the value within the cell to which it is linked on the spreadsheet. This portion of the control logic terminates in an End block 186.

Figure 5:
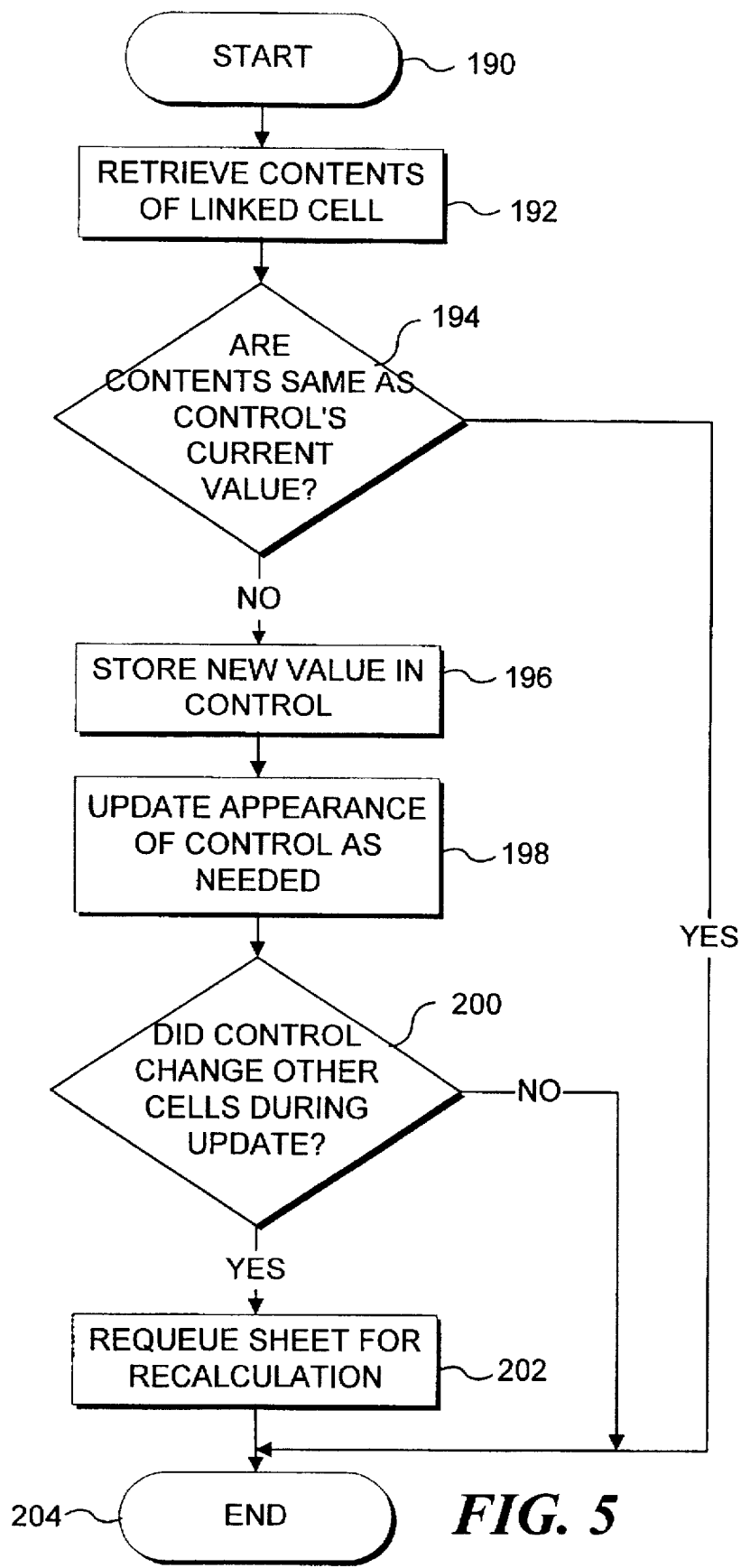
FIG. 5 is a flow chart disclosing the logic employed in the present invention in updating the graphic control in response to changes in the linked cells of the spreadsheet.

The steps involved in updating the graphic control as changes are made in the spreadsheet that change the value of the cell to which the graphic control is linked are shown in FIG. 5, beginning at a Start block 190. A block 192 provides for retrieving the contents of the spreadsheet cell to which the graphic control is linked. Depending upon the type of graphic control, the contents of the linked cell may be an ordinal number, a number between a minimum and a maximum number in a range, or a Boolean value (i.e., TRUE, FALSE), or #N/A. If the graphic control is a check box, it will appear checked if the linked cell value is TRUE or is a non-zero number. A FALSE or zero value in the linked cell causes the check box to appear unchecked, and a #N/A value causes the check box to appear grayed.

If a plurality of option boxes are grouped together, the linked cell displays the ordinal number of the option box currently selected, since only one option box in a group can be selected at a time. The "tab order" assigned to the option boxes within the group determines order in which each option box is selected by successively tabbing through the option boxes and this order determines the corresponding ordinal number for each of the option boxes. If an ordinal number is directly assigned to a linked cell for several option boxes and that number does not correspond to the ordinal number of any option box in the group, none of the option boxes appear selected. It should be noted that it is only necessary to link one option box in a group in order to link every option box in the group. If a plurality of option boxes are not grouped within a group box, all of the option boxes on the worksheet or in a dialog box are treated as being within a single group.

A decision block 194 in FIG. 5 determines if the contents of the linked cell are the same as the control's current value. For example, the position of the slider in a scrollbar graphic control defines a value that is compared to the value in the linked cell in decision block 194. If the values are the same, the logic proceeds to an End block 204. However, if the linked cell value and the corresponding graphic control value are different, a block 196 stores the new value corresponding to the linked cell value in the graphic control.

A block 198 then updates the visual appearance of the graphic control as necessary so that the new value stored for the graphic control is reflected in it. This step corresponds to selecting or deselecting option boxes and check boxes, redrawing the slider as necessary to represent the new value, for a scrollbar graphic control, or changing the selected item in a list box, drop-down list box, or combination list edit or drop-down list-edit boxes, as necessary.

A decision block 200 determines if the graphic control caused other spreadsheet cells to change when it was updated. Since other spreadsheet cells in the spreadsheet may include formulas that depend upon the value in the linked cell, decision block 200 determines if a change in the linked cell value must be used to update other cells of the spreadsheet. If so, a block 202 re-cues the spreadsheet for recalculation to reflect such changes in spreadsheet cells that are dependent upon the linked cell. Recalculation may also cause changes in a chart where values displayed in the chart are dependent upon the linked cell. The logic terminates at End block 204 after the spreadsheet is recalculated. A negative response to decision block 200 also leads to End block 204, since no further action is required.

Figure 6:
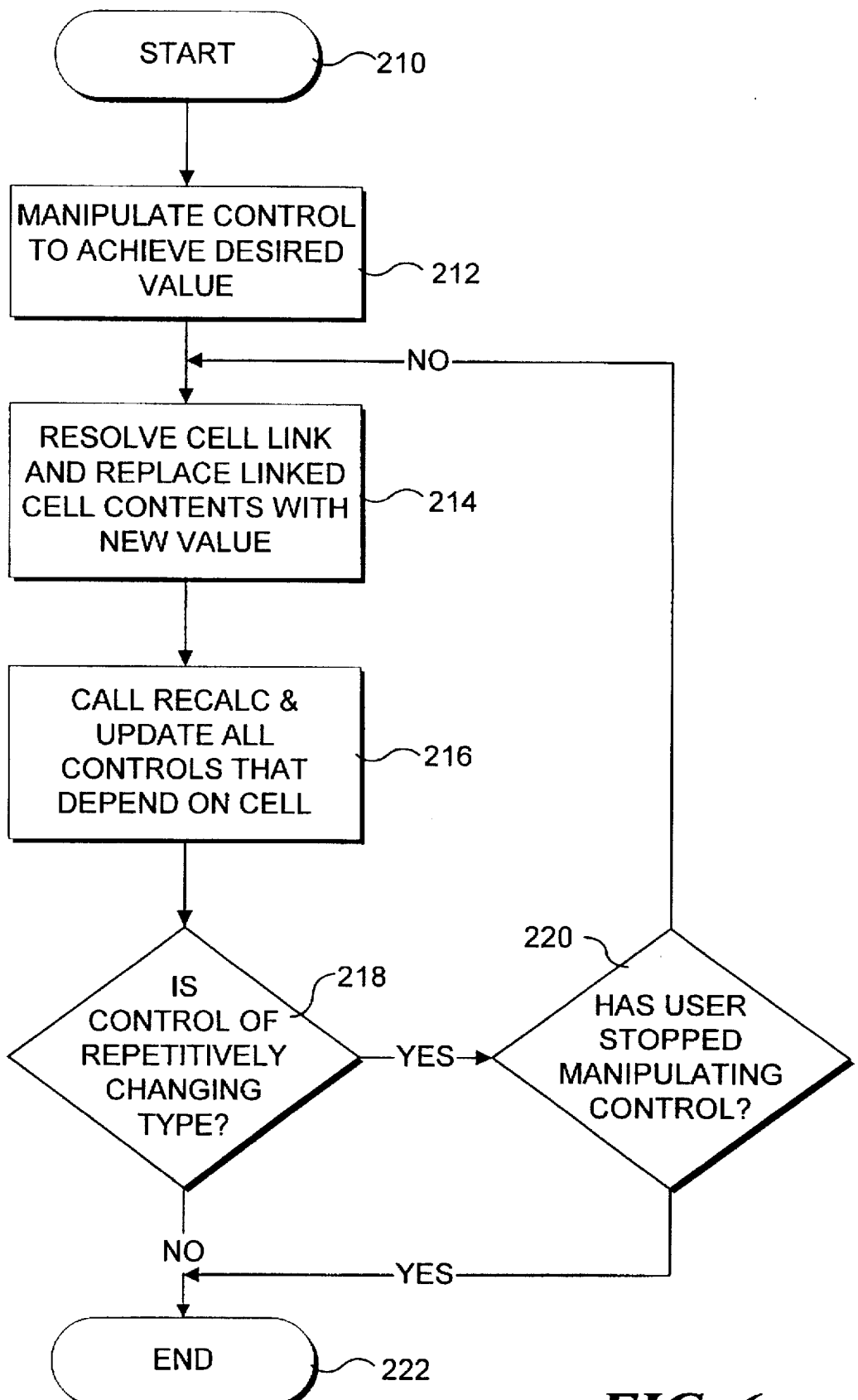
FIG. 6 is a flow chart disclosing the logic employed in the present invention to update the linked cells in the spreadsheet when the graphic control is manipulated by the user.

In FIG. 6, the steps involved in changing the linked cell within the spreadsheet to reflect changes in the graphic control caused by user manipulation are shown, beginning at a Start block 210. In a block 212, the user manipulates the graphic control to achieve a desired value. Such manipulation may involve checking or unchecking a check box, selecting one of the option boxes, thereby causing other option boxes in a group to be deselected, selecting an entry in a list box, in a drop-down list box, in a list-edit box, or in a combination drop-down list-edit box, or manipulating the slider in a scrollbar graphic control, or increasing or decreasing the value using the spinner graphic control.

A block 214 resolves changes in the graphic control in the cell that is linked to the graphic control by replacing the cell contents with the new value that corresponds to the change made by the user in the graphic control. In a block 216, the spreadsheet program recalculates and updates all controls that depend upon the cell linked to the graphic control that the user has just manipulated and changed. Since more than one graphic control can be associated with a single spreadsheet cell, changes by the user of any graphic control linked to a spreadsheet cell will cause other graphic controls that are linked to it to change in a corresponding fashion. Further, changes in the linked cell caused by manipulation of the graphic control must be reflected in other cells of the spreadsheet that are dependent upon the linked cell, such as through mathematical formulas that reference the linked cell as a parameter. The results of such calculations are then provided as updated values in the spreadsheet cells to which the results are assigned or in a chart if the manipulation of the graphic control causes a change in a linked cell on which the chart depends.

A decision block 218 determines if the graphic control is of a repetitively changing type. An example of a repetitively changing graphic control is the scrollbar, since manipulation by the user involves changing the position of the slider over a period of time so that the slider occupies positions on the scrollbar having successively higher or lower values. If so, the logic next proceeds to a decision block 220 that determines if the user has stopped manipulating the control (prior to the last recalculation carried out in block 216). An affirmative response to decision block 220 leads to an End block 222, as does a negative response to decision block 218. However, if the user is still manipulating the graphic control, the logic proceeds from decision block 220 back to block 214 so that the now current value reflected by the user's manipulation of the graphic control can be reflected within the linked cell. In this manner, manipulation of the graphic control by the user causes the value in the linked cell and all cells that depend upon it to repetitively change until the user stops manipulating the graphic control. Further, if the linked cell comprises a variable within a chart, the chart is also redrawn to reflect the new value that corresponds to the user manipulation of the linked cell.

While the present invention employs selected graphic controls in a manner that requires no programming skill, it will be appreciated that more complex control functions can be achieved with graphic controls that are positioned on a spreadsheet, or a dialog sheet, or on a chart in accordance with the present invention, by associating an application program with the graphic control. After the user has manipulated the graphic control, the application program would apply the value in the linked cell to the program to carry out further instructions. However, one of the features of the present invention is that the graphic control comprises a powerful tool that can be used without such programming, enabling users without programming skills to use such a tool within a spreadsheet. By encouraging users to employ such tools, it is likely that at least some may be motivated to develop an understanding of the application programming language that can be used with the tools to implement more powerful control functions.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for enabling a user to graphically control a cell of a spreadsheet, comprising the steps of:

(a) providing a toolbar on which is disposed a graphic representation of a control;

(b) enabling the user to select the graphic representation of the control on the toolbar and position a copy of the graphic representation of the control in a workspace selected by the user on a display, said workspace comprising one of the spreadsheet, a dialog sheet, a chart, and a macro sheet; and (c) enabling the user to link said cell of the spreadsheet to the control without requiring the user to enter code to effect the link, linkage of said cell to the control causing a value in said cell to change as the user varies a corresponding parameter of the control by graphically manipulating the control with a user interface.

2. The method of claim 1, further comprising the step of enabling the user to size the graphic representation of the control in the workspace, by selecting a first position in the workspace as a first corner of the control, and then dragging a cursor in the display to a second position in the workspace to indicate a diagonally opposite corner of the control.

3. The method of claim 1, further comprising the step of enabling the user to select a menu item that opens a dialog box in which the user identifies said cell to which the control is linked, said link comprising a property of the control.

4. The method of claim 3, wherein the user is enabled to identify said cell to which the control is linked in the dialog box by selecting said cell in the spreadsheet.

5. The method of claim 1, further comprising the step of enabling the user to identify the cell to which the control is linked by selecting a dialog box used for entry of a formula in a toolbar, and then selecting said cell in the spreadsheet while the control is selected.

6. The method of claim 1, wherein the control comprises one of a check box, an option box, a list box, a drop-down box, a combination list-edit box, a combination drop-down list-edit box, a scrollbar, and a spinner.

7. The method of claim 1, wherein a change in the value of said cell to which the control is linked causes a corresponding change in the parameter of the control.

8. The method of claim 1, wherein the control comprises one of a list box, a drop-down box, a combination list-edit box, and a combination drop-down list-edit box, further comprising the step of enabling the user to indicate a range of cells in the spreadsheet as line entries in the control.

9. The method of claim 8, wherein selection of one of the line entries in the range of cells causes a numeric value to be returned in said cell to which the control is linked, said numeric value corresponding to an ordinal number of the line entry selected in the line entries.

10. The method of claim 1, wherein the control comprises a scrollbar, further comprising the step of enabling the user to specify a minimum value and a maximum value for a range of values encompassed by the scrollbar as the user graphically manipulates a slider in the scrollbar from one extreme position to an opposite extreme position.

11. The method of claim 10, further comprising the step of enabling the user to specify an incremental change in the value each time that the user clicks on an arrow of the scrollbar with a pointing device.

12. The method of claim 10, further comprising the step of enabling the user to specify an incremental change in the value each time that the user pages the scrollbar.

13. The method of claim 1, wherein the control comprises a spinner, further comprising the step of enabling the user to specify a start value and an end value for a range of values encompassed by the spinner as the user selects one of two arrows displayed in the spinner.

14. The method of claim 13, further comprising the step of enabling the user to specify an incremental change in the value that will occur each time that the user graphically manipulates one of the arrows.

15. The method of claim 1, wherein the control comprises an option box in a group of option boxes, the value in said cell to which the control is linked comprising an ordinal number of the option box within said group.

16. The method of claim 1, wherein the control comprises a check box, said cell to which the check box is linked having a true value if the user enters a check into the check box and a false value if the check is not entered in the check box.

17. The method of claim 1, wherein the control comprises a check box, said check box displaying a check if the user enters a non-zero number in said cell to which the check box is linked, but not displaying a check if the user enters a zero in said cell to which the check box is linked.

18. The method of claim 1, further comprising the step of enabling the user to link one cell of the spreadsheet to a plurality of controls.

19. The method of claim 18, wherein a change to the value of said one cell causes said plurality of controls to change in a corresponding manner.

20. The method of claim 1, wherein if any other cell in the spreadsheet includes a formula that depends upon the value of said cell to determine a result, said result is repetitively recalculated as the user continues to manipulate the control linked to said cell.

21. A method for controlling a value in a selected cell of a spreadsheet, comprising the steps of:
    (a) inserting a control in a workspace comprising one of the spreadsheet, a chart, a dialog sheet, and a macro sheet;
    (b) linking the control to the selected cell of the spreadsheet without requiring the user to enter code to effect the link; and
    (c) varying a parameter of the control by graphically manipulating the control, a value in said selected cell changing in a corresponding manner as the parameter changes as a result of the linking of the control to the selected cell.

22. The method of claim 21, wherein the control comprises one of a check box, an option box, a list box, a combination list-edit box, a combination drop-down list-edit box, a scrollbar, and a spinner.

23. The method of claim 21, wherein a change in the value of the specific cell causes a corresponding change in the parameter of the control.

24. The method of claim 21, further comprising the step of repetitively recalculating all formulas that depend upon the value of the specific cell as the control parameter continues to change.

25. The method of claim 21, further comprising the step of repetitively updating any chart that depends upon the value of the specific cell in the spreadsheet.

26. The method of claim 21, further comprising the step of linking the specific cell in the spreadsheet to a plurality of controls, so that a change in the parameter of any of the plurality of controls caused by manipulating the control causes a corresponding change in the value of the specific cell and a change in the value of the specific cell causes a corresponding change in the parameters of each of the plurality of controls.

27. The method of claim 21, wherein the control comprises one of a list box, a drop-down box, a combination list-edit box, and a combination drop-down list-edit box, further comprising the step of specifying a range of cells in the spreadsheet that are user selectable entries in said one control.

28. The method of claim 21, further comprising the step of specifying incremental changes in the parameter as the control is manipulated.

29. A spreadsheet system comprising:
    a personal computer having a central processing unit, a memory, a display screen, a user interface, and a non-volatile storage unit, said memory storing program instructions that control operation of the central processing unit so that it functions as a spreadsheet application, said program instructions further causing said central processing unit to:
    (a) display a plurality of control icons on the display screen in order to enable a user to select a control icon with the user interface and to position a graphic control represented by the control icon in a workspace comprising one of the spreadsheet, a chart, a dialog sheet, and a macro sheet, appearing on the display screen;
    (b) specify a cell in the spreadsheet to which the graphic control selected by the user is linked without requiring the user to enter code to effect the link; and
    (c) vary a value of said cell as the user changes a parameter of the graphic control by manipulating it with the user interface, said value varying as the control is manipulated because said cell is linked to the graphic control.

30. The spreadsheet system of claim 29, wherein the program instructions are further operative to cause the parameter of the graphic control to change as the user changes the value in said cell of the spreadsheet that is linked to the graphic control.

31. The spreadsheet system of claim 29, wherein the program instructions further cause any other cells of the spreadsheet that depend upon the value of said cell to repetitively recalculate as the user continues to change the parameter of the graphic control.

32. The spreadsheet system of claim 29, wherein the program instructions enable the user to set a plurality of variables that define properties of the graphic control using a dialog box that is opened on the display screen, said properties being retained with the spreadsheet when the spreadsheet is stored as a file on the non-volatile storage unit.

33. The spreadsheet system of claim 29, wherein the program instructions cause any chart that depends upon the value of said cell that is linked to the graphic control to change as the user manipulates the graphic control with the user interface, to vary the parameter.

34. The spreadsheet system of claim 29, wherein the control comprise one of a check box, an option box, a list box, a drop-down box, a combination list-edit box, a combination drop-down list-edit box, a scrollbar, and a spinner.

35. The spreadsheet system of claim 29, wherein the program instructions further enable the user to assign a procedure to the graphic control that is linked to said cell, the value of said cell being updated in response to the user manipulating the graphic control, and the central processing unit then executing the procedure using said value.

* * * * *